United States Patent
Nuzzarello

(10) Patent No.: US 6,786,542 B1
(45) Date of Patent: Sep. 7, 2004

(54) ARTICULATING ADJUSTABLE RESISTANCE SUSPENSION SEAT

(76) Inventor: Joseph Nuzzarello, 26W107 Tomahawk Dr., Wheaton, IL (US) 60187

( * ) Notice: Subject to any disclaimer, the term of this patent is extended or adjusted under 35 U.S.C. 154(b) by 0 days.

(21) Appl. No.: 10/684,177

(22) Filed: Oct. 10, 2003

Related U.S. Application Data

(63) Continuation of application No. 10/004,040, filed on Oct. 31, 2001, now abandoned.

(51) Int. Cl.$^7$ .................................................. B62J 1/00
(52) U.S. Cl. .................................... 297/201; 297/195.1
(58) Field of Search ................................ 297/201, 196, 297/195.1, 213, 208

(56) References Cited

U.S. PATENT DOCUMENTS

| | | | | |
|---|---|---|---|---|
| 604,347 A | * | 5/1898 | Bray | 297/201 |
| 621,140 A | * | 3/1899 | Reuter | 297/312 |
| 694,875 A | * | 3/1902 | Meighan | 297/201 |
| 2,152,553 A | * | 3/1939 | Lobdell | 297/213 |
| 2,331,213 A | * | 10/1943 | Mesinger | 297/203 |
| 4,387,925 A | * | 6/1983 | Barker et al. | 297/201 |
| 4,451,086 A | * | 5/1984 | Seven | 297/312 |
| 4,512,608 A | * | 4/1985 | Erani | 297/201 |
| 4,541,668 A | * | 9/1985 | Rouw | 297/201 |
| 5,464,271 A | * | 11/1995 | McFarland | 297/209 |
| 5,823,618 A | * | 10/1998 | Fox et al. | 297/201 |
| 5,988,740 A | * | 11/1999 | Caraballo | 297/201 |
| 6,183,043 B1 | * | 2/2001 | Nelson | 297/201 |
| 6,290,291 B1 | * | 9/2001 | Kojima | 297/201 |
| 6,302,480 B1 | * | 10/2001 | Hall | 297/201 |
| 6,357,825 B1 | * | 3/2002 | Bavaresco | 297/201 |
| 6,402,235 B1 | * | 6/2002 | Letendre | 297/195.1 |

FOREIGN PATENT DOCUMENTS

GB    2121740 A1 * 10/1984    ................ 297/201

* cited by examiner

Primary Examiner—Peter M. Cuomo
Assistant Examiner—Stephanie Harris
(74) Attorney, Agent, or Firm—Rick Martin; Patent Law Offices of Rick Martin, P.C.

(57) ABSTRACT

An improved design in bicycle, unicycle or tricycle seats as related an articulating, adjustable resistance seat, which acts in reducing perineal pressure, providing support to proper parts of the pelvis while allowing variable seat resistance adjustments and width adjustments according to the anatomy of the rider. The ability to allow an upward/downward movement of the seat with downward resistance provides the rider with an energy assist when the leg is moving in the upward position. This action will result in less fatigue to the rider especially when engaged in racing over long periods. Resistance can be applied by a spring, spring-hinge, torsion bar or other means.

11 Claims, 7 Drawing Sheets

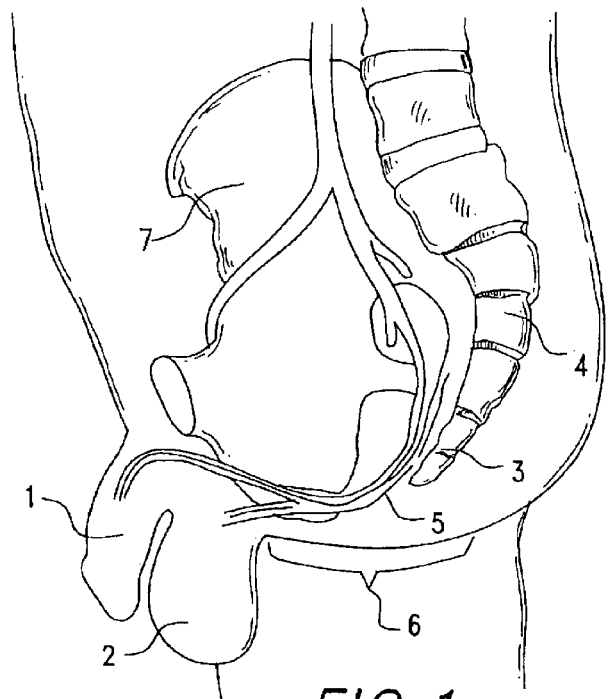
FIG. 1
(PRIOR ART)
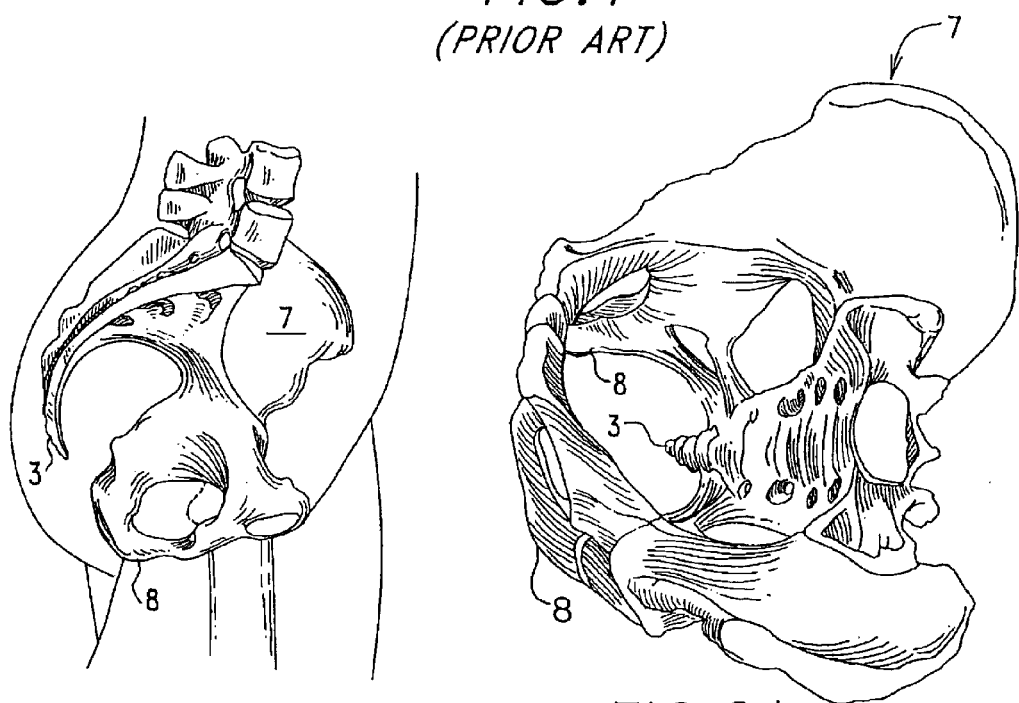
FIG. 2B
(PRIOR ART)
FIG. 2A
(PRIOR ART)

ARTICULATING ADJUSTABLE RESISTANCE SUSPENSION SEAT

CROSS REFERENCE TO RELATED APPLICATION

This application is a continuation application of parent application Ser. No. 10/004,040 filed Oct. 31, 2001 now abandoned titled "Articulating, Adjustable Resistance Suspension Seat."

FIELD OF THE INVENTION

The present invention relates to an improved design in seats and specifically to an articulating, adjustable resistance bike seat, which acts in reducing perineal pressure, providing support to proper parts of the pelvis while allowing seat resistance adjustments while in the process of cycling.

BACKGROUND OF THE INVENTION

The major problem in the current designs of seats that support a rider when peddling a moveable or stationary bicycle is that a bike seat does not support the body well. Problems arise with pressure on the soft tissue areas of the groin, numbness in the genitalia, pressure and rubbing in the rectal and tail bone area, chafing due to rubbing and excessive surface area contact, and shock absorption among others. Cures for these problems have been tried since the invention of the bicycle. Most bicycle seats are substantially fixed and rigid in design. Proper support while peddling is a critical problem to be overcome.

U.S. Pat. No. D348,785 (1994) to White discloses a design of a bicycle seat with a one-piece design.

U.S. Pat. No. 572,062 (1896) to Peck discloses left and right hinged leaves of a bicycle seat wherein a walking-bar forces the opposite leave up as one leave falls with movements of the rider. Thus an upward force is imparted to one side, the force being directly proportional to the downward force on the opposite side.

U.S. Pat. No. 603,734 (1898) to Peck discloses a bicycle seat with a stationary member to support the riders weight and a left and a right hinged flap of a bicycle seat with a walking bar urging the opposite flap to rise as the alternate flap moves downward.

U.S. Pat. No. 4,541,668 (1985) to Rouw discloses a bicycle or tricycle seat with left and right buttock support members pivotally attached to the rear end and support in the front end whereby the front end of one of the members moves downwardly by a certain distance, the front end of the opposite member will move upwardly by a proportional amount.

U.S. Pat. No. 5,167,435 (1992) to Aldi discloses a left and right folding flap to facilitate mounting and dismounting of a bicycle.

U.S. Pat. No. 5,720,518 (1998) to Harrison discloses left and right cushions for a bike seat to ease pressure for a rider's tailbone, soft tissues and genitalia.

U.S. Pat. No. 5,911,474 (1999) to Lee discloses fixed and adjustable left and right seat support sections with a recess to accommodate the bicycle rider's genitalia.

U.S. Pat. No. 5,988,740 (1999) to Caraballo discloses two elongated seat sections with a reciprocating mechanism that causes the sections to move in reciprocal opposite directions.

U.S. Pat. No. 6,116,683 (2000) to Maier discloses a one-piece bike seat that pivots upward and downward along with a forward and rearward motion.

U.S. Pat. No. 6,158,806 (2000) to White discloses a one-piece contoured bike seat to provide support and hygienic safety.

The article "Bicycle riding as a cause of erectile dysfunction" (Vol. 14, No. 5, September/October 2000 from YOUR PATIENT & FITNESS) describes bicycle riding as being implicated as a cause of erectile dysfunction in younger men due to trauma to the blood supply and nerves of the penis.

The article "THE MALE-SAFE BICYCLE SEAT" found at web site www.wimall.com/rormeister/30.html under bicycle accessories describes a dual action seat with movement in the upward and downward and also side-to-side movements. It also does not provide a stable platform when starting from a stop position or trying to get seated. There is no resistance to movement although the span of movement is adjustable.

What is needed is a bicycle, tricycle and/or unicycle seat that offers the rider body support, allows movement when peddling as the pelvis rocks back and forth, has resistive adjustability and buttock width adjustability to the rider's physical characteristics, and reduces perineal pressure which can lead to several medical problems, including erectile dysfunction, urethral stricture (scar) disease and chronic epididymitis along with a great degree of discomfort to the rider.

SUMMARY OF THE INVENTION

The main aspect of the present invention is a dual part bicycle seat with each seat part moving during the action of peddling.

Another aspect of the present invention is to provide an adjustable resistance mechanism to the moving parts of the seat.

Another aspect of the present invention is to provide for proper pelvic support to the ischial tuberosities when in the act of riding.

Another aspect of the present invention is to provide for an adjustable separation between the seat parts to allow for differences in pelvic size.

Another aspect of the present invention is to significantly reduce perineal pressure to reduce the risk of urologic injuries.

Other aspects of this invention will appear from the following description and appended claims, reference being made to the accompanying drawings forming a part of this specification wherein like reference characters designate corresponding parts in the several views.

Bicycle riding has been linked to erectile dysfunction (ref. Article above from "YOUR PATENT & FITNESS") in both racing bicyclists and stationary bikes in their home or gym. This article also points out problems with unicycling and regular biking. The problems are noted to be linked to excessive pressure applied to the perineum, such as occurs when a man rests his weight on a bicycle seat resulting in stress and sexual dysfunction.

The pelvis is a rigid structure with three major attachment points: both hips, and the lumbar spine. In walking, running and peddling actions, the pelvis rocks or swings at the point of connection to the spine, with the hips moving in both a hinging and rolling motion. This motion is especially evident when peddling a bicycle. A standard bicycle seat supports the body by putting pressure on the perineum. The perineum is the area between the testes and the rectum. Chronic perineal pressure leads to several medical problems, including erectile dysfunction, urethral sticture (scar) disease and chronic epididymitis, not to mention discomfort to most riders. Solid support for the pelvis is one in which pelvic motion is restricted. Wider seats help pelvic support but restrict motion, which in turn, reduces the energy applied by the rider and eventually cause discomfort.

Seats with holes or windows in the center have been designed to decrease pressure on the pudendal nerve but have no motion and no support to the ischial tuberosities.

The present invention eliminates these problems. It provides support directly to the ischial tuberosities while supplying motion. The ischial tuberosities are bones located on the underside of the pelvis and are areas where support is desired, especially when in the act of riding. The present invention does not allow for pressure to be applied to the perineal area.

The present invention consists of a seat with two moving parts, each independent of the other. Both parts are padded and can be round or oval in design. Both seat parts provide resistance against the peddling action to allow propulsion without causing the rider to fall forward. The present invention seat can be used for any requirement where a peddling motion is involved. Examples are bicycles, tricycles, unicycles, stationary peddling machines found in the home or gym, etc.

The present invention provides an articulating, adjustable resistance bicycle seat. The resistance is in each independent seat part. The resistance is applied against the downward motion of the seat. This resistance can be designed in various ways including but not restricted to:

a.) A coil spring mechanism (the preferred embodiment) with a variable adjustment. The adjustment having (but not limited to):
      1.) a spring adjustment via a hex wrench for tension adjustment similar to a door latch.
      2.) a hand thumb screw for tension adjustment similar to a skate key permanently mounted or removable. A permanently mounted design would make "on-the-fly" adjustments possible.
   b.) A torsion bar mechanism with a variable position adjustment.
   c.) A hydraulic piston with variable resistance adjustability.
   d.) Other designs including leaf springs, non-adjustable leaf springs, etc.

The present invention provides the ability to have a variable resistance allowing the riders flex to be stiffer or softer depending on the adjustment level. When the resistance is decreased, the rider is forced to use more leg strength to remain in the sitting position, resulting in a more strenuous exercise. Thus a higher level of resistance would usually be the most comfortable. The presence of resistance will provide the rider with an energy assist when the leg is moving in the upward position. This action will result in less fatigue to the rider especially when engaged in racing over long periods.

The present invention also provides for an adjustment of the spacing between both seat parts to allow for various pelvic sizes. This adjustment will allow both of the seat parts to be spread apart to seat properly under the riders pelvis according to the pelvis size.

BRIEF DESCRIPTION OF THE DRAWINGS

FIG. 1 is a schematic illustration showing the normal male anatomy.

FIG. 2A is a top perspective view of the bones and ligaments of the pelvis.

FIG. 2B is a schematic of the pelvis in a standing position.

Figure 3A:
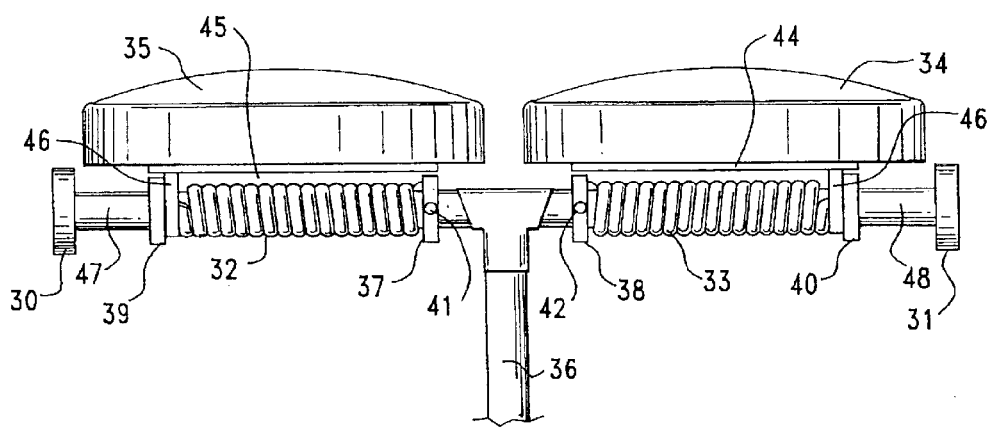
FIG. 3A is a front view of an alternate embodiment of the present invention with resistance spring mechanisms located in a centered position.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

FIG. 1 is a schematic illustration showing the-normal male anatomy. The pelvis 7 is shown along with the sacrum 4 and the coccyx 3 which are all major bones in the lower male anatomy. The major arteries and blood vessels 5 carry blood to the testes 2 and the penis 1. When excessive pressure is applied to the perineum 6, such as occurs when a man rests his entire weight on the bicycle (unicycle or tricycle) seat, compression of the penile blood supply and nerves may occur. Such stress, concentrated in this single anatomical area and repeated over a long period of time may result in sexual dysfunction. The injury may involve peripheral nerves in those same areas, resulting in paresthesias and loss of transmission from the central nervous system to the cavemosal arteries of the penis, thus affecting vascular function as well.

FIG. 2A is a top perspective view of the bones and ligaments of the pelvis 7. The figure shows the coccyx 3 along with all other pelvic bones. The major bones of concern are the ischial tuberosities 8. The ischium bones are the major bones upon which the body rests when sitting. The ischial tuberosity is the most dependent portion of the ischium bone. A properly designed bicycle (unicycle or tricycle) seat will support the weight of a rider on the ischial tuberosities 8 rather than in the perineal area (See FIG. 1). For example, a rider weighing 150 pounds who accidentally falls 15 inches onto the top tube of a bicycle may exert up to a quarter ton of force on the perineum, causing serious injury.

FIG. 2B is a schematic of the pelvis 7 in a standing position. The coccyx 3 is shown towards the rear of the male anatomy and the ischial tuberosity 8 on the right side of the anatomy is shown (See discussion above regarding the ischium bone 8 support).

FIG. 3A is a front view of an alternate embodiment of the present invention with resistance spring mechanisms 32,33 located in a centered position under each respective seat section 35,34. The T-shaped support bar 36 supports the seat mounting assembly 49. Seat mounting assembly 49 comprises spring tension adjustment knobs 30,31, adjustment shafts 47, 48, resistance spring mechanisms 32,33, spring stop brackets 37,38, spring adjust plates 39,40 having separation adjustment set screws 41,42, respectively, and bracket supports 46 mounted to seat attach brackets 44,45. The left buttock seat 34, which is padded, is attached with a left seat attach bracket 44 to the left spring mechanism 33 by means of bracket support 46. The left spring mechanism 33 and left buttock seat 34 can slide along shaft 48 of the T-shaped support bar 36. Left spring mechanism 33 and left seat 34 are positioned along shaft 48 at a desired distance from T-section 36a of support bar 36 by means of a left spring stop bracket 38 which can be held in place with the left separation adjustment set screw 42. The spring resistance of left spring mechanism 33 is set by adjusting the left spring adjust plate 40 which can be set at various positions by rotating the left spring tension adjustment knob 31 in a counterclockwise or clockwise direction. Knob 31 rotation causes left adjustment shaft 48 to rotate, which thereby compresses or decompresses left spring mechanism 33. This action decreases or increases the resistance against the downward action of the left buttock seat 34. In a like manner the right buttock seat 35 is padded and attached with a right seat attach bracket 45 to the right spring mechanism 32 by means of bracket support 46. The right spring mechanism 32 and right buttock seat 35 can slide along the T-shaped support bar 36. Right spring mechanism 32 and right seat 35 are positioned along shaft 47 at a desired distance from T-section 36a of support bar 36 by means of a right spring stop bracket 37 which can be held in place with the right separation adjustment set screw 41. The spring resistance of right spring mechanism 32 is set by adjusting the right spring adjust plate 39 which can be set at various positions by rotating the right spring tension adjustment knob 30 in a counterclockwise or clockwise direction. Knob 30 rotation causes right adjustment shaft 47 to rotate, which thereby compresses or decompresses right spring mechanism 32. This action decreases or increases the resistance against the downward action of the right buttock seat 35.

Figure 3B:
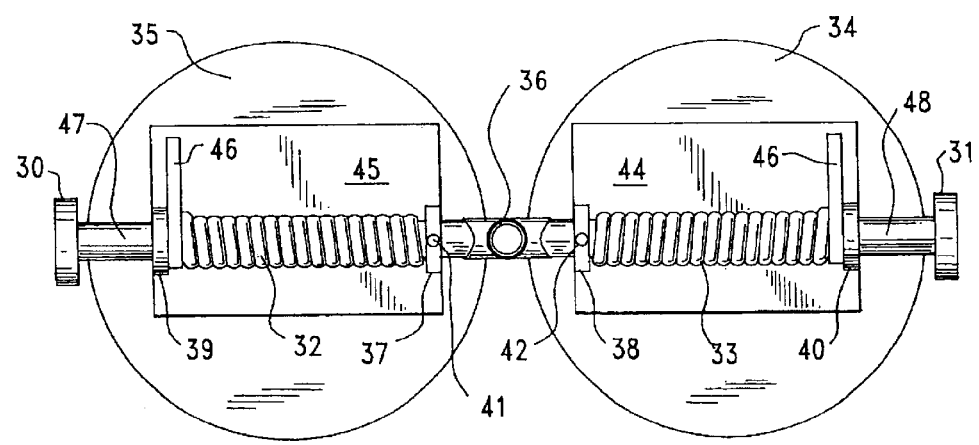
FIG. 3B is a top view of an alternate embodiment of the present invention with resistance spring mechanisms located in a centered position.

FIG. 3B is a top view of an alternate embodiment of the present invention with resistance spring mechanisms 32,33 located in a centered position. It should be noted that the positioning of the left buttock seat 34 and right buttock seat 35 could be centered directly above the T-shaped support bar 36 or in an off-centered position depending on design requirements. The left spring stop bracket 38 locations are adjustable horizontally along the T-shaped support bar 36 as is the right spring stop bracket 37. The horizontal adjustment along the T-shaped support bar 36 will provide separation of the left buttock seat 34 and the right buttock seat 35 according to the anatomy of the individual rider's buttocks. The spring tension adjustment knobs 30,31 can be rotated clockwise or counterclockwise to move the spring adjust plates 39,40 which, in turn, would increase or decrease the downward seat resistance of the buttock seats 34,35 according to the rider's individual body weight and structure for the optimal comfort.

Figure 3C:
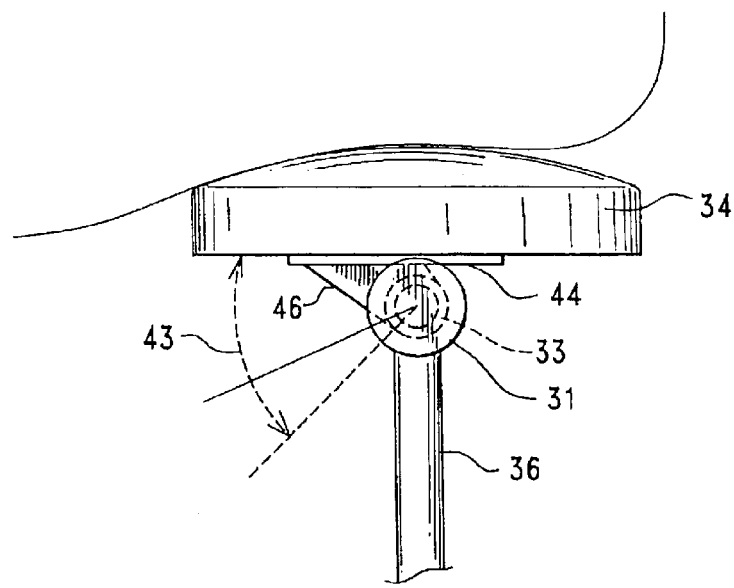
FIG. 3C is a left side view of an alternate embodiment of the present invention with resistance spring mechanisms located in a centered position.

FIG. 3C is a left side view of an alternate embodiment of the present invention with resistance spring mechanism 33 located in a centered position. The left buttock seat 34 is attached by means of a left seat attach bracket 44 and left bracket support 46 to the left spring mechanism 33 which, in turn, is attached to the T-shaped support bar 36. The left spring tension adjustment knob 31 is readily accessible to the rider. The spring opposes the downward movement of the left buttock seat 34, thereby causing the seat to pivot in the direction of an arc direction 43 shown. The rearward motion of the seat is limited by seat attach bracket 44 in a horizontal plane. As shown in FIGS. 3A, 3B, 3C, bracket support 46 pivotally mounts on support bar 36. Thus, the left seat member may pivot forwardly and rearwardly independently of the forward/rearward pivotability of the right seat member. As seen in FIGS. 3A, 3B, 3C, the pivot assembly or each seat member is a part of the seat mounting assembly of the present invention.

Figure 4:
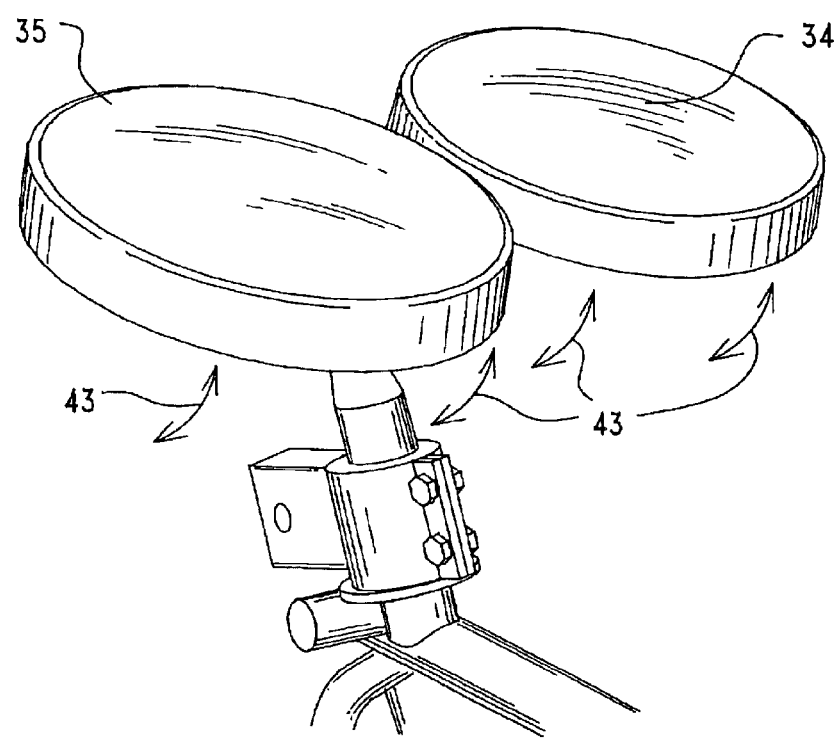
FIG. 4 is a front perspective view of the present invention.

FIG. 4 is a front perspective view of the present invention. It should be noted that the design of the present invention will allow for the left and right buttock seats 34, 35 to support the pelvis directly by the ischium bones and does not allow for pressure to be applied in the perineum area as previously discussed. The adjustable resistance is against the downward arc direction 43 of each seat independently.

Figure 5A:
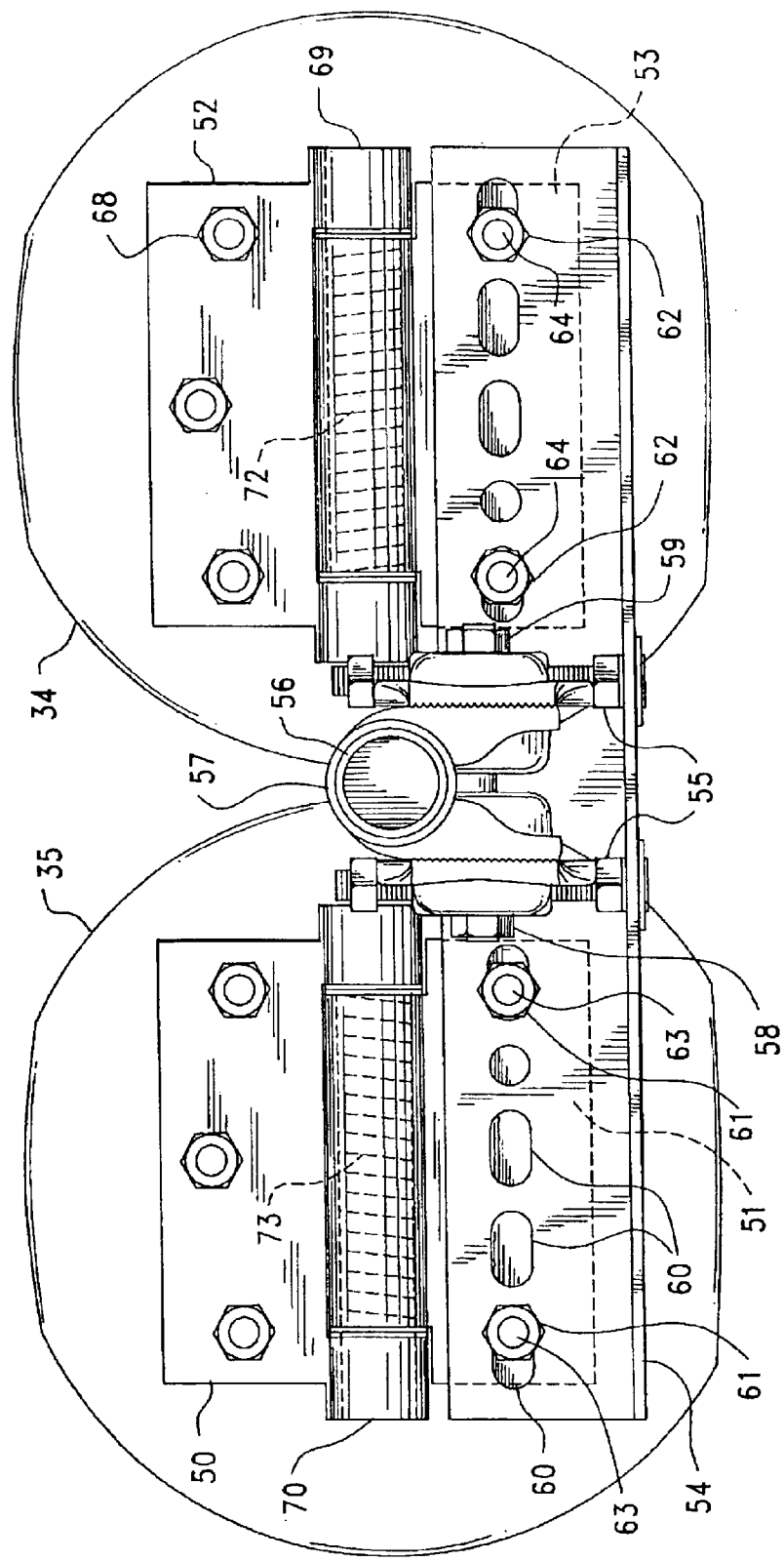
FIG. 5A is a bottom view of the preferred embodiment of the present invention.

FIG. 5A is a bottom view of the preferred embodiment of the present invention. In this embodiment the downward resistance is applied by means of adjustable spring-loaded hinges. Each hinge has two parts. The left buttock seat 34 is attached to the left outer hinge 52. The left inner hinge 53 contains the left adjustable resistance spring 72. The left inner hinge 53 also has a hexagonal inner bolt 69, which is turned clockwise or counterclockwise to increase or decrease the left adjustable resistance spring 72 force of downward resistance. The left inner hinge 53 is mounted to the cross-support bar 54 by means of attachment bolts 64 and attachment nuts 62. The mounting is done via selecting various separation holes 60 to set the proper distance between the left buttock seat 34 and the right buttock seat 35 according to the rider's anatomy.

Likewise the right buttock seat 35 is attached to the right outer hinge 50. The right inner hinge 51 contains the right adjustable resistance spring 73. The right inner hinge 51 also has a hexagonal inner bolt 70, which is turned clockwise or counterclockwise to increase or decrease the right adjustable resistance spring 73 force of downward resistance. The right inner hinge 51 is mounted to the cross-support bar 54 by means of attachment bolts 63 and attachment nuts 61. The mounting is done via selecting various separation holes 60 to set the proper distance between the left buttock seat 34 and the right buttock seat 35 according to the rider's anatomy.

The cross-support bar 54 contains support bar mounting brackets 55 contain holes to accept a variable position post bracket 57 by means of a post mounting bolt 58 and post mounting nut 59. The variable mounting post bracket 57 sets the fixed front-to-rear seat positioning relative to the bicycle (unicycle or tricycle) mounting support post 56. In this depiction the buttock seats 34,35 are shown mounted to the cross-support bar 54 to the rear of center. Design requirements can elect to move the mounting to other locations with respect to center as required.

It should be noted that many nuts, bolts, brackets, etc. could potentially be eliminated by an integrated design to encompass such parts within a single or several molds. This would decrease the quantity of parts required.

Figure 5B:
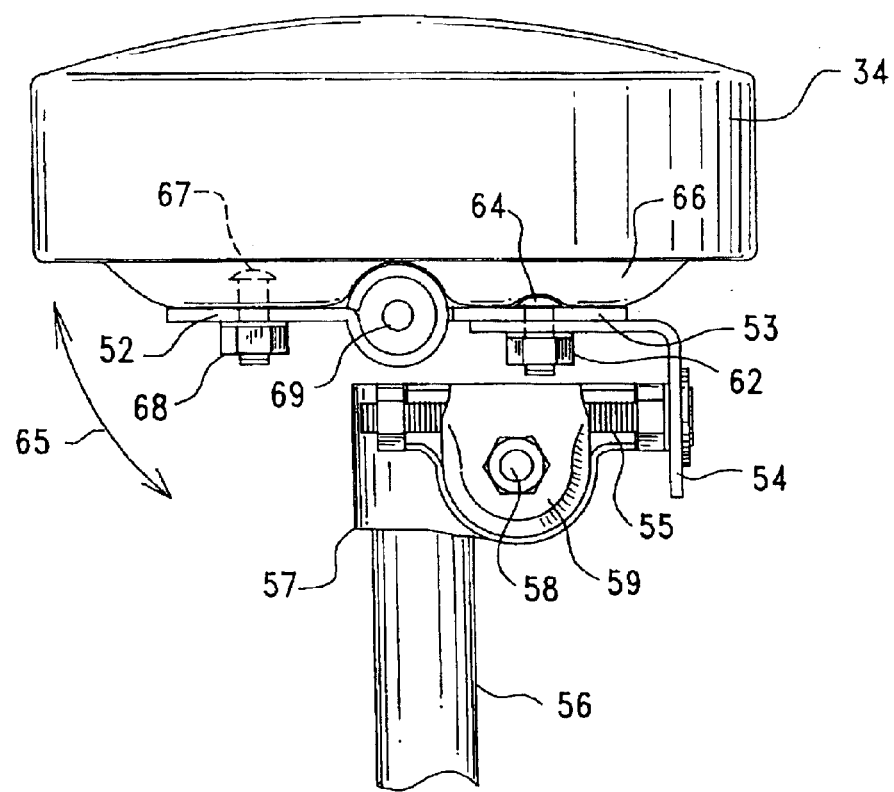
FIG. 5B is a left side view of the preferred embodiment of the present invention.

FIG. 5B is a left side view of the preferred embodiment of the present invention. The left buttock seat 34 is attached to a seat flange 66 which, in turn, is attached to the left outer hinge 52 via bolt 67 and nut 68 and to the left inner hinge 53 with bolt 64 and nut 62 respectively. As shown, bolt 64 and nut 62 also attach left inner flange 53 to the cross-support bar 54. Movement of the left buttock seat 34 is in an arc 65 with resistance in the upward direction. Hexagonal inner bolt 69, which is turned clockwise or counterclockwise, increases or decreases the left adjustable resistance. Cross-support bar 54 is mounted to variable position post bracket 57 by means of bolt 58 and nut 59. The location within variable position post bracket 57 sets the initial front to back tilt of the buttock seats. Variable position post bracket 57 is mounted to bicycle (unicycle or tricycle) mounting support post 56. Seat flange 66 has movement in an arc direction 65. Upward motion is stopped when seat flange 66 comes into contact with left inner hinge 53 at the end of its upward motion.

Figure 5C:
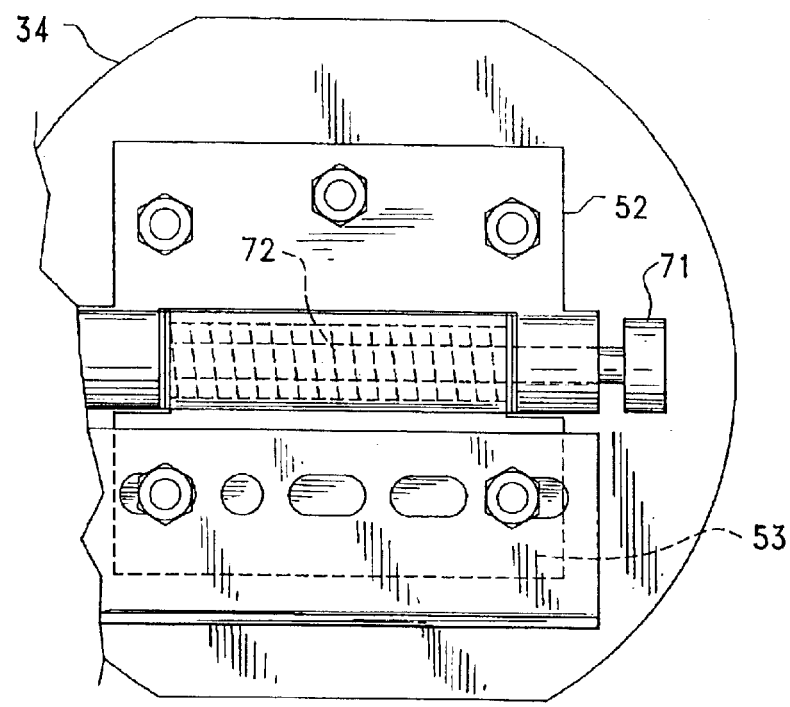
FIG. 5C is a bottom view showing the preferred embodiment of the preferred invention but with an alternate tension adjustment means.

FIG. 5C is a bottom view showing the preferred embodiment of the present invention but with an alternate tension adjustment means. Left buttock seat 34 is attached to left outer hinge 52 as described in FIGS. 5A, 5B. The left adjustable resistance spring 72 contained within left inner hinge 53 is adjusted with a knob 71 in lieu of the hexagonal inner bolt 69 described previously. A knob 71 (thumb screw or other design) would allow for on-the-fly adjustability of the spring resistance.

Figure 6:
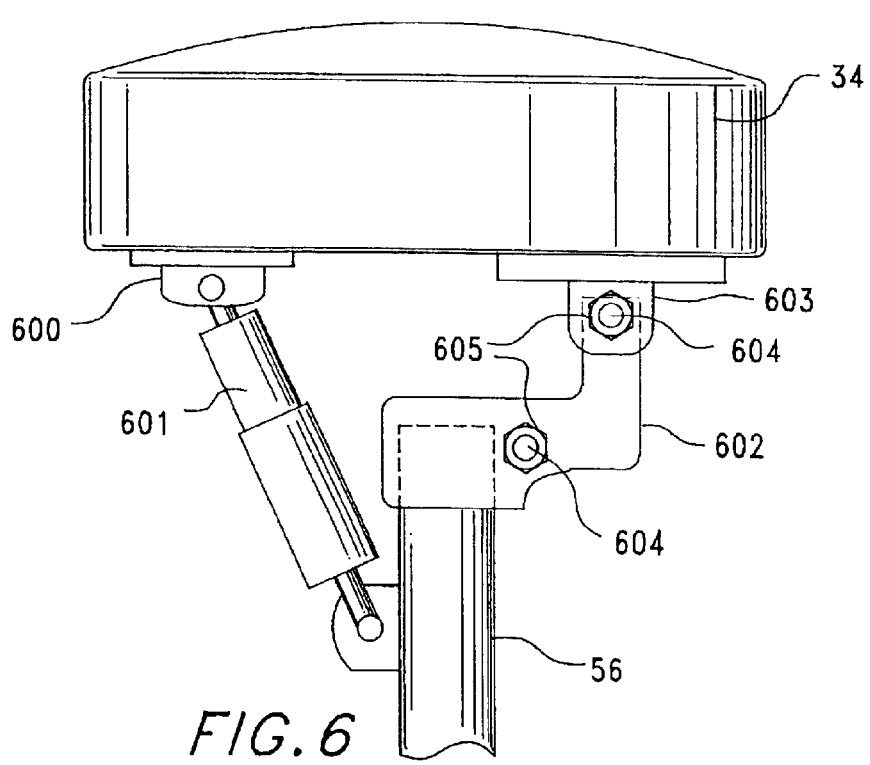
FIG. 6 is a side view of an alternate embodiment of the present invention showing an alternate resistance by means of a hydraulic pump mechanism.

FIG. 6 is a side view of an alternate embodiment of the present invention showing an alternate resistance by means of a hydraulic pump mechanism 601, which may be adjustable. The left buttock seat 34 is attached to a rear seat attach bracket 603, which in turn is attached to a rear post attach bracket 602 by means of attach bolt 604 and attach nut 605. The left buttock seat 34 is also attached to a hydraulic mechanism 601 by means of a front seat attach bracket 600. The hydraulic mechanism is attached at its other end to mounting support post 56. When the rider exerts a downward force (when in the act of peddling), the hydraulic mechanism 601 compresses and thus supplies a resistive force against the downward motion of the rider's leg. When the rider's leg reaches its bottommost position the hydraulic mechanism 601 expands back to its original position.

Figure 7:
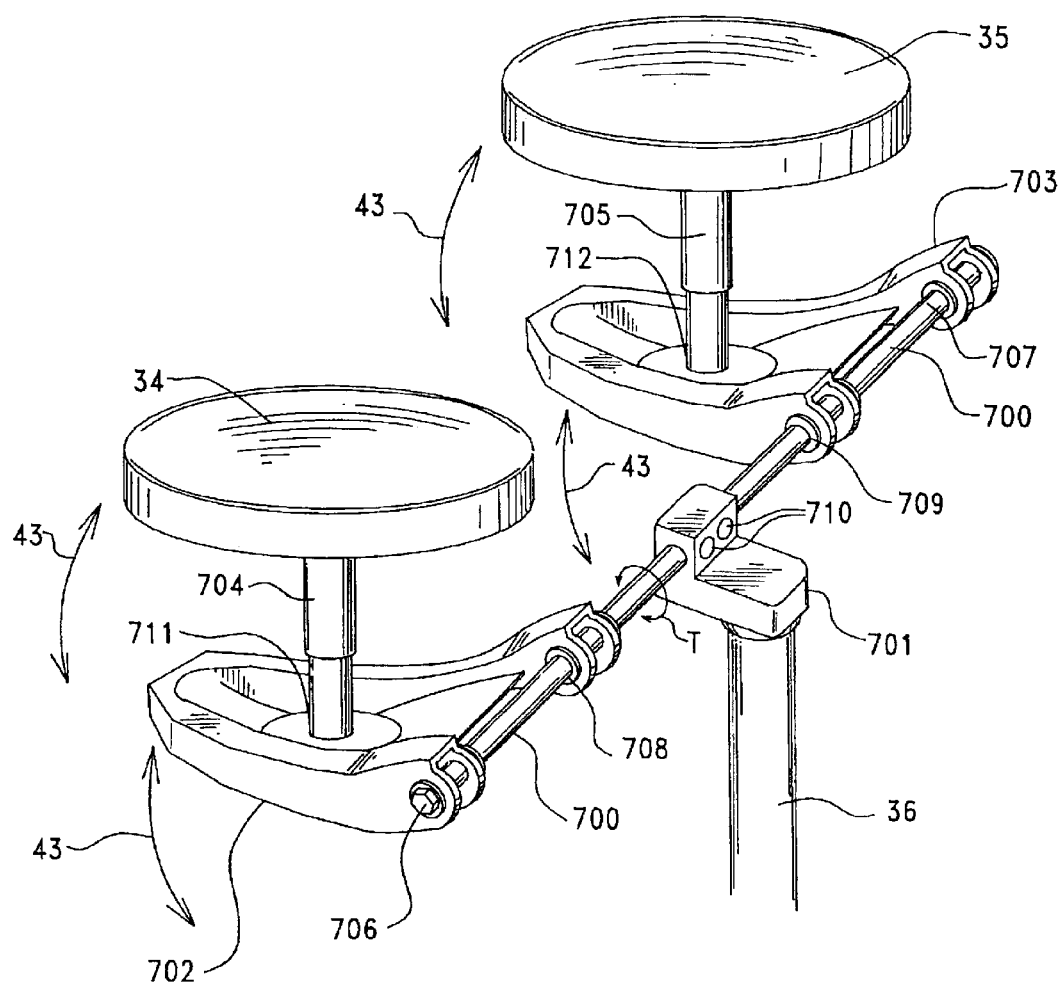
FIG. 7 is a rear side prospective view of an alternate embodiment of the present invention showing a torsion bar design.

FIG. 7 is a rear side prospective view of an alternate embodiment of the present invention showing a torsion bar 700 design. In this alternate embodiment left buttock seat 34 is firmly mounted to left seat post 704 which, in turn, is hard mounted to left seat torsion bar bracket 702 at the left seat post base 711. Left seat torsion bar bracket 702 is firmly attached to torsion bar 700 at its outer point 706. The left seat torsion bar brackets inner point 708 can be firmly attached or loosely attached (via a bushing) to torsion bar 700 depending on design requirements. Thus left seat torsion bar bracket 702, left seat post base 711, and left buttock seat 34 all move as one unit in an arc direction 43 and offer resistance to the downward leg motion of the rider. The torsion bar beneath left buttock seat 34 twists T with the rider's downward force.

In a similar manner, right buttock seat 35 is firmly mounted to right seat post 705 which, in turn, is hard mounted to right seat torsion bar bracket 703 at the right seat post base 712. Right seat torsion bar bracket 703 is firmly attached to torsion bar 700 at its outer point 707. The right seat torsion bar brackets inner point 709 can be firmly attached or loosely attached (via a bushing) to torsion bar 700 depending on design requirements. Thus right seat torsion bar bracket 703, right seat post base 712, and right buttock seat 35 all move as one unit in an arc direction 43 and offer resistance to the downward leg motion of the rider. The torsion bar beneath right buttock seat 35 twists T with the rider's downward force.

Torsion bar 700 is firmly attached to bicycle (unicycle or tricycle) post 36 which has a post to torsion bar bracket 701 welded or firmly attached to its top. The initial angle of the torsion bar 700 can be adjusted by setscrews 710 (or other means) depending on the rider's preferences. Torsion bars can be designed (and thus procured) in various twist strengths depending on the individual rider's weight. Separation of the left and right buttock seats 34,35 can be accomplished by setting the left and right seat torsion bar brackets 702, 703 initial position on the torsion bar 700.

There are other potential designs that would offer a resistance against the downward motion of a riders let that, although not shown, could accomplish the same upward resistive force. These designs could include, but are not limited to, leaf springs etc. It should be noted that the design of the present invention as described in all of the above figures will allow for the left and right buttock seats 34, 35 to support the pelvis directly by the ischium bones and does not allow for pressure to be applied in the perineum area as previously discussed. The adjustable resistance, in all designs, is against the downward motion of each seat independently such that the presence of the downward resistance will provide the rider with an energy assist when the leg is moving in the upward direction. Although the present invention has been described with reference to preferred embodiments, numerous modifications and variations can be made and still the result will come within the scope of the invention. No limitation with respect to the specific embodiments disclosed herein is intended or should be inferred.

I claim:

1. A bicycle seat comprising:
   a seat mounting assembly suitable for mounting on a T-shaped support bar for attachment to a bicycle;
   a left and a right seat member, each of said seat members having a forward/rearward pivot mount assembly means as part of the seat mounting assembly wherein the forward/rearward pivot mount assembly means functions to provide a spring biased pivot axis for each of said seat members on the T-shaped support bar;
   wherein each forward/rearward pivot mount assembly means has an independently adjustable spring;
   wherein said independently adjustable spring causes a variable tension to resist a rider's downward force on the respective seat member;
   wherein the left and right seat members are each independently adjustable along a horizontal member of the T-shaped support bar to accommodate proper buttock spacing dependent on the anatomy of the rider;
   wherein the seat mounting assembly further comprises:
   a seat attach bracket having a bracket support connected to the horizontal member, said bracket support having a pivot mount adjustable about the horizontal member;
   said horizontal member having a spring tension adjustment mechanism one each on its opposing ends;
   each said spring tension adjustment mechanism controlling an adjustment shaft and a spring adjust plate;
   each said spring adjust plate abutting its respective bracket support;
   each said bracket support abutting its respective coiled resistance spring mechanism;
   each said coiled resistance spring mechanism abutting a spring stop bracket;
   each said spring stop bracket having an adjustable mount along the horizontal member;
   a left and a right seat member, each member being attached to the seat attach bracket; and wherein each coiled resistance spring mechanism is an independently adjustable spring, thereby enabling an independent adjustment of each seat member's return force against a rider's downward force.

2. The apparatus of claim 1, wherein the spring tension adjustment mechanism is an easy access knob.

3. A bicycle seat comprising:

a T-shaped support bar for attachment to a bicycle;

a seat mounting assembly attachable to a horizontal member of the T-shaped support bar;

said seat mounting assembly comprising a seat attach bracket having a bracket support connected to the horizontal member, said bracket support having a pivot mount adjustable about the horizontal member;

said horizontal member having a spring tension adjustment mechanism one each on its opposing ends;

each said spring tension adjustment mechanism controlling an adjustment shaft and a spring adjust plate;

each said spring adjust plate abutting its respective bracket support;

each said bracket support abutting its respective coiled resistance spring mechanism;

each said coiled resistance spring mechanism abutting a spring stop bracket;

each said spring stop bracket having an adjustable mount along the horizontal member;

a left and a right seat member, each member being attached to the seat attach bracket; and wherein each coiled resistance spring mechanism is an independently adjustable spring, thereby enabling an independent adjustment of each seat member's return force against a rider's downward force.

4. The apparatus of claim 3, wherein the spring stop bracket adjustable mount further comprises a separation adjustment set screw, thereby allowing for movement of the left and right seat members along the horizontal member to accommodate proper buttock spacing dependent on the anatomy of the rider.

5. The apparatus of claim 3, wherein the spring tension adjustment mechanism further comprises an easy access knob.

6. A bicycle seat comprising:

a T-shaped support bar for supporting a seat mounting assembly;

said seat mounting assembly connectable to a left and a right seat member;

wherein the seat mounting assembly furtherer comprises two spring tension adjustment mechanisms, two adjustment shafts, two spring adjust plates, two bracket supports, two seat attach brackets, two spring mechanisms, two spring stop plates, and two separation adjustment means functioning to secure the spring stop bracket to the T-shaped support bar;

wherein the spring tension adjustment mechanisms are on opposing ends of the T-shaped support bar;

each said spring tension adjustment mechanism is connected to its respective adjustment shaft;

each said adjustment shaft is connected to its respective spring adjust plate;

each said spring adjust plate is abutting its respective bracket support;

each said bracket support has a sliding engagement along a horizontal portion of the T-shaped support bar;

each said bracket support is formed from its respective seat attach bracket;

each said seat attach bracket is connected to its respective seat member;

each said bracket support abuts its respective resistance spring mechanism;

each said resistance spring mechanism abuts its respective spring stop plate; and each said spring stop plate is adjustable along the horizontal portion of the T-shaped support bar.

7. The apparatus of claim 6, wherein the spring tension adjustment mechanism is an easy access knob.

8. A bicycle seat comprising:

a T-shaped support bar functioning to support a seat mounting assembly;

said seat mounting assembly having an adjustable spring means connectable to a left seat member and an adjustable spring means connectable to a right seat member;

each of said adjustable spring means functioning to provide an independently variable spring tension on its respective seat member, thereby allowing a user to vary a resistance against a downward movement of said respective seat member; and wherein the seat mounting assembly further comprises an adjustment shaft, a spring adjust plate, a bracket support, a seat attach bracket, a spring stop plate, and a separation adjustment means functioning to secure the spring stop bracket to the T-shaped support bar.

9. The apparatus of claim 8, wherein the left and right seat members are padded and substantially round in shape.

10. The apparatus of claim 8, wherein the left and right seat members are each independently adjustable along a horizontal member of the T-shaped support bar to accommodate proper buttock spacing dependent on the anatomy of a rider.

11. The apparatus of claim 8, wherein said seat mounting assembly further comprises a spring tension adjustment mechanism on a free end of said T-shaped support bar, thereby allowing said user to manually adjust said variable spring tension on said respective seat member.

* * * * *